United States Patent
Tomoi

(10) Patent No.: US 9,267,025 B2
(45) Date of Patent: Feb. 23, 2016

(54) METHOD FOR PRODUCING THERMOPLASTIC ELASTOMER COMPOSITION

(71) Applicant: The Yokohama Rubber Co., Ltd., Tokyo (JP)

(72) Inventor: Shusaku Tomoi, Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 0 days.

(21) Appl. No.: 14/386,161

(22) PCT Filed: Nov. 19, 2012

(86) PCT No.: PCT/JP2012/079977
§ 371 (c)(1),
(2) Date: Sep. 18, 2014

(87) PCT Pub. No.: WO2013/140664
PCT Pub. Date: Sep. 26, 2013

(65) Prior Publication Data
US 2015/0045511 A1 Feb. 12, 2015

(30) Foreign Application Priority Data
Mar. 23, 2012 (JP) ................................ 2012-067448

(51) Int. Cl.
| | | |
|---|---|---|
| C08L 23/00 | (2006.01) | |
| C08L 29/00 | (2006.01) | |
| C08L 77/00 | (2006.01) | |
| C08L 33/08 | (2006.01) | |
| B29B 7/88 | (2006.01) | |
| C08G 59/32 | (2006.01) | |
| C08L 23/08 | (2006.01) | |
| C08L 23/26 | (2006.01) | |
| C08G 69/48 | (2006.01) | |
| C08L 77/02 | (2006.01) | |
| C08L 77/06 | (2006.01) | |
| C08L 51/06 | (2006.01) | |
| B29B 9/06 | (2006.01) | |
| B29B 9/16 | (2006.01) | |
| C08K 5/00 | (2006.01) | |
| B29B 7/48 | (2006.01) | |
| B29C 47/00 | (2006.01) | |
| B29K 21/00 | (2006.01) | |
| B29C 47/40 | (2006.01) | |
| B29K 63/00 | (2006.01) | |
| B29C 47/60 | (2006.01) | |
| B29K 77/00 | (2006.01) | |
| B29K 105/24 | (2006.01) | |

(52) U.S. Cl.
CPC . *C08L 33/08* (2013.01); *B29B 7/88* (2013.01); *C08G 59/32* (2013.01); *C08G 69/48* (2013.01); *C08L 23/08* (2013.01); *C08L 23/0861* (2013.01); *C08L 23/26* (2013.01); *C08L 51/06* (2013.01); *C08L 77/02* (2013.01); *C08L 77/06* (2013.01); *B29B 7/482* (2013.01); *B29B 9/065* (2013.01); *B29B 9/16* (2013.01); *B29C 47/0004* (2013.01); *B29C 47/402* (2013.01); *B29C 47/6056* (2013.01); *B29C 47/6087* (2013.01); *B29K 2021/003* (2013.01); *B29K 2063/00* (2013.01); *B29K 2077/00* (2013.01); *B29K 2105/24* (2013.01); *C08K 5/0025* (2013.01); *C08L 2312/00* (2013.01)

(58) Field of Classification Search
None
See application file for complete search history.

(56) References Cited

U.S. PATENT DOCUMENTS

| | | | |
|---|---|---|---|
| 5,047,478 | A | 9/1991 | Ohmae et al. |
| 2010/0112257 | A1 | 5/2010 | Morooka |
| 2011/0028651 | A1 | 2/2011 | Kawaguchi et al. |
| 2011/0305863 | A1 | 12/2011 | Morooka |
| 2012/0214943 | A1 | 8/2012 | Sato et al. |

FOREIGN PATENT DOCUMENTS

| | | | |
|---|---|---|---|
| CN | 101993577 | A | 3/2011 |
| EP | 2290003 | * | 3/2001 |
| EP | 2184323 | A1 | 5/2010 |
| JP | S63-146928 | A | 6/1988 |
| JP | H10-45920 | A | 2/1998 |
| JP | H11-279286 | A | 10/1999 |
| JP | 2007-224288 | | 9/2007 |
| JP | 2010-132850 | A | 6/2010 |
| JP | 2011-052210 | A | 3/2011 |
| JP | 2012-041448 | A | 3/2012 |
| JP | 2012-072306 | A | 4/2012 |

* cited by examiner

*Primary Examiner* — Ana Woodward
(74) *Attorney, Agent, or Firm* — Novak Druce Connolly Bove + Quigg LLP

(57) ABSTRACT

A method for producing a thermoplastic elastomer composition including a thermoplastic resin composition as a continuous phase and also including a modified elastomer dispersed into the continuous phase as a dispersed phase, wherein the method comprises, in the stated order: (1) a step for reacting a polyamide resin and an epoxy group-containing polymer together to generate an end-capped polyamide resin; (2) a step for adding EVOH and a modified elastomer to the product obtained in step (1); (3) a step for dispersing the EVOH into the product obtained in step (1); (4) a step for adding a cross-linking agent for cross-linking the modified elastomer to the dispersion obtained in step (3); and (5) a step for cross-linking the modified elastomer using the cross-linking agent; and wherein the thermoplastic resin composition comprises EVOH and an end-capped polyamide resin.

11 Claims, No Drawings

METHOD FOR PRODUCING THERMOPLASTIC ELASTOMER COMPOSITION

CROSS REFERENCE TO RELATED APPLICATIONS

This application is a National Phase filing under 35 U.S.C. §371 of PCT/JP2012/079977 filed on Nov. 19, 2012; and this application claims priority to Application No. 2012-067448 filed in Japan on Mar. 23, 2012 under 35 U.S.C. §119; the entire contents of all are hereby incorporated by reference.

TECHNICAL FIELD

The present invention relates to a process for producing a thermoplastic elastomer composition, and more particularly, the present invention relates to a simple process for producing a thermoplastic elastomer composition having excellent processability and dynamic fatigue durability.

BACKGROUND ART

Ethylene-vinyl alcohol copolymers (EVOH) have been known to have excellent gas barrier properties, but have drawbacks in that they have poor flexibility, and particularly they are brittle at low temperature, whereas polyamide resins have been known to have excellent fatigue durability as well as excellent gas barrier properties. Although it is expected that a thermoplastic elastomer comprising as a continuous phase a thermoplastic resin composition comprising an ethylene-vinyl alcohol copolymer and a polyamide resin as well as a modified elastomer as a dispersed phase has excellent gas barrier properties and fatigue durability as described above, there is a problem that, when an ethylene-vinyl alcohol copolymer, a polyamide resin and a modified elastomer are kneaded to produce such a thermoplastic elastomer composition, the reaction of the ethylene-vinyl alcohol copolymer with the polyamide resin results in gelation. Although a method of capping the end amino groups of a polyamide resin capable of reacting with an ethylene-vinyl alcohol copolymer with an epoxy monomer is known (for example, Patent Documents 1 and 2), epoxy monomers have a problem that they are difficult to handle, since, in general, they are liquid or gaseous at normal temperature and pressure, and are harmful to human health and environment, and also have a problem that it is necessary to allow a polyamide resin to react with an epoxy monomer in advance prior to kneading an ethylene-vinyl alcohol copolymer and a modified elastomer. In case that a polyamide resin and an epoxy monomer are reacted with each other in advance prior to kneading them with an ethylene-vinyl alcohol copolymer and a modified elastomer, a process for producing a thermoplastic elastomer composition is carried out in two steps of reacting the polyamide resin with the epoxy monomer, and kneading the resulting reaction product with the ethylene-vinyl alcohol copolymer and the modified elastomer, and therefore a more simple process for producing a thermoplastic elastomer composition has been required. In addition, in case that the reaction of a polyamide resin with an epoxy monomer is carried out using a twin-screw kneading extruder, it is difficult to knead a polyamide resin which is, with an epoxy monomer, since epoxy monomers are liquid or gaseous at normal temperature and pressure, and therefore it is necessary to introduce an epoxy monomer in the twin-screw kneading extruder from the middle of the kneading section of the twin-screw kneading extruder and to knead a polyamide resin in a molten state with the epoxy monomer. Accordingly, it is necessary to use a twin-screw kneading extruder having a high L/D ratio, a ratio of the effective screw length L to the screw diameter D. Twin-screw kneading extruders having a high L/D ratio are not practical, since they require a large facility investment and have a long residence time for materials within the extruder.

RELATED DOCUMENTS

Patent Documents

[Patent Document 1] Japanese Unexamined Patent Publication (Kokai) No. 2010-132850
[Patent Document 2] Japanese Unexamined Patent Publication (Kokai) No. 2011-52210

SUMMARY OF INVENTION

Problems to be Solved by the Invention

Accordingly, the purpose of the present invention is to provide a simple process for producing a thermoplastic elastomer composition having excellent processability and dynamic fatigue durability.

Means to Solve the Problems

According to the present invention, a process for producing a thermoplastic elastomer composition is provided comprising as a continuous phase a thermoplastic resin composition and as a dispersed phase a modified elastomer dispersed in the continuous phase, wherein the process comprising, in order, the steps of:
(1) reacting a polyamide resin with an epoxy group-containing polymer to produce an end-capped polyamide resin,
(2) adding an ethylene-vinyl alcohol copolymer and a modified elastomer to a product obtained in step (1),
(3) dispersing the ethylene-vinyl alcohol copolymer in the product obtained in step (1),
(4) adding a crosslinking agent for crosslinking the modified elastomer to a product obtained in step (3), and
(5) crosslinking the modified elastomer with the crosslinking agent,
wherein the thermoplastic resin composition comprising the ethylene-vinyl alcohol copolymer and the end-capped polyamide resin.

The thermoplastic elastomer composition produced by the process of the present invention exhibits good processability and dynamic fatigue durability, and therefore is useful in various applications (for example, pneumatic tires, hoses for gas or fluid transport, ship fenders, rubber bags, fuel tanks, etc.) that require such properties. According to the present invention, various manufactured articles produced from the thermoplastic elastomer composition, for example, a pneumatic tire having a layer formed from the thermoplastic elastomer composition of the present invention, etc., are also provided.

Effects of the Invention

The process for producing a thermoplastic elastomer composition of the present invention comprises a step of end-capping the polyamide resin with the epoxy group-containing polymer, and therefore has an advantage that it can be carried out in one step in a simple manner using a kneader, for example, a twin-screw kneading extruder. In addition, the epoxy group-containing polymer is solid and has little volatility and a lower harmfulness to the human health and environment than epoxy monomers, and therefore has an advantage that it is easy to handle.

Mode for Carrying Out the Invention

Step (1) in the above process of the present invention is a step of reacting a polyamide resin with an epoxy group-containing polymer to produce an end-capped polyamide resin. At least one end amino group of the polyamide resin is capped with the epoxy group-containing polymer. If this step is carried out, for example, using a twin-screw kneading extruder, this step can be carried out by melt-kneading the polyamide resin and epoxy group-containing polymer introduced through the feeding port located on the upstream side in the extrusion direction of the twin-screw kneading extruder, in a kneading section set at a temperature which is equal to or higher than the melting temperature of the polyamide resin and which is equal to or higher than the melting temperature of the epoxy group-containing polymer. The melt-kneading conditions in the first kneading section can be appropriately selected by a person with ordinary skill in the art, depending on the types and amounts of the polyamide resin and epoxy group-containing polymer used. The melt kneading temperature in the first kneading section may be a temperature which is equal to or higher than the melting temperature of the polyamide resin and is equal to or higher than the melting temperature of the epoxy group-containing polymer, at which temperature the polyamide resin and epoxy group-containing polymer react with each other, and is typically about 180° C. to about 250° C. The melt kneading (dynamic crosslinking) time (retention time) in the first kneading section is typically about 5 seconds to about 3 minutes. In step (1), a product comprising an end-capped polyamide resin is produced. Since the end amino groups of the polyamide resin are capped with an epoxy group-containing polymer, even if the ethylene-vinyl alcohol copolymer and modified elastomer are contained at high contents in the thermoplastic elastomer composition finally obtained (in case that a modified elastomer capable of reacting with a polyamide resin if the polyamide resin is not end-capped is used), the thermoplastic elastomer composition can exhibit good flow properties and film-forming properties.

Examples of the polyamide resin which can be used in the present invention include Nylon 6, Nylon 66, Nylon 11, Nylon 12, Nylon 610, Nylon 612, Nylon 6/66 copolymer, Nylon 6/12 copolymer, Nylon MXD6, Nylon 6T, etc. One of these polyamide resins may be used, or two or more of these polyamide resins may be used in combination. Nylon 6, Nylon 66, Nylon 612, Nylon 6/66 copolymer, and Nylon 6/12 copolymer are preferred, since they provide good fatigue resistance and good gas permeation preventing properties.

The epoxy group-containing polymer which can be used in the present invention is a polymer having one or more epoxy group in a molecule. Examples of the epoxy group-containing polymer include ethylene-glycidyl methacrylate copolymer (E-GMA), ethylene-glycidyl methacrylate-vinyl acetate copolymer (E-GMA-VA), ethylene-glycidyl methacrylate-methyl acrylate copolymer (E-GMA-MA), ethylene-glycidyl methacrylate-ethyl acrylate copolymer (E-GMA-EA), ethylene-glycidyl methacrylate-graft-polystyrene (E-GMA-g-PS), ethylene-glycidyl methacrylate-graft-acrylonitrile-styrene copolymer (E-GMA-g-AS), epoxidized styrene-butadiene-styrene block copolymer (E-SBA), epoxidized natural rubber (E-NA), etc., and one of these epoxy group-containing polymers may be used or two or more of these epoxy group-containing polymers may be used in combination. The amount of the epoxy group-containing polymer is 0.5 to 40 parts by weight, and preferably 1 to 35 parts by weight, per 100 parts by weight of the polyamide resin. If the amount of the epoxy group-containing polymer with respect to the polyamide resin is too low, it is not possible to prevent the gelation due to the reaction of the polyamide resin with the ethylene-vinyl alcohol copolymer and the modified elastomer (in case that a modified elastomer capable of reacting with a polyamide resin is used if the polyamide resin is not end-capped is used). If the amount of the epoxy group-containing polymer with respect to the polyamide resin is too high, the flow properties during melting is reduced, and thereby significantly deteriorating the film-forming properties of the kneaded mixture.

Subsequent to step (1), step (2) is carried out in which an ethylene-vinyl alcohol copolymer and a modified elastomer are added to the product produced in step (1). For example, in case that step (2) is carried out using a twin-screw kneading extruder, this step is carried out by introducing the ethylene-vinyl alcohol copolymer and the modified elastomer into the twin-screw kneading extruder through the second feeding port located on the downstream side in the extrusion direction from the first kneading section. The second feeding port is located between the first kneading section and the second kneading section as described below.

The ethylene-vinyl alcohol copolymer (EVOH) which can be used in the present invention can be prepared by a well-known technique, for example, by polymerizing ethylene with vinyl acetate to prepare ethylene-vinyl acetate copolymer (EVA), and hydrolyzing the resulting EVA. The ethylene-vinyl alcohol copolymer preferably has an ethylene content of 1 to 55 mol %, in view of gas barrier properties and flexibility. In addition, the ethylene-vinyl alcohol copolymer preferably has a saponification degree of 90% or more, in view of gas permeation preventing properties and thermal stability during forming. Ethylene-vinyl alcohol copolymers are commercially available, for example, under Soarnol® H4815B (ethylene unit content: 48 mol %), Soarnol® H4412B (ethylene unit content: 44 mol %), Soarnol® E3808B (ethylene unit content: 38 mol %), and Soarnol® D2908 (ethylene unit content: 29 mol %) from The Nippon Synthetic Chemical Industries Co. Ltd., EVAL® G156B (ethylene unit content: 48 mol %), EVAL® E171B (ethylene unit content: 44 mol %), EVAL® H171B (ethylene unit content: 38 mol %), EVAL® F171B (ethylene unit content: 32 mol %), and EVAL® L171B (ethylene unit content: 27 mol %) from Kuraray Co., Ltd. A single ethylene-vinyl, alcohol copolymer may be used, or two or more ethylene-vinyl alcohol copolymers may be used in combination. The amount of the ethylene-vinyl alcohol copolymer is 10 to 100 parts by weight based on 100 parts by weight of the modified elastomer.

The modified elastomer which can be used in the present invention has a functional group which is preferably an acid anhydride group, or a carboxylic acid group or derivatives thereof. Even more preferably, the modified elastomer has an acid anhydride group, in view of the compatibility with the polyamide resin. The rubber which constitutes the modified elastomer includes ethylene-α-olefin copolymers, ethylene-unsaturated carboxylic acid copolymers or derivatives thereof, etc. Ethylene-α-olefin copolymers include ethylene-propylene copolymer, ethylene-butene copolymer, ethylene-pentene copolymer, ethylene-hexene copolymer, ethylene-octene copolymer, etc. Ethylene-unsaturated carboxylic acid copolymers or derivatives thereof include ethylene-acrylic acid copolymer, ethylene-methacrylic acid copolymer, ethylene-methyl acrylate copolymer, ethylene-methyl methacrylate copolymer, ethylene-ethyl acrylate copolymer, ethylene-ethyl methacrylate copolymer, ethylene-butyl acrylate copolymer, ethylene-butyl methacrylate copolymer, etc. The modified elastomer is preferably in an amount of 80 to 200 parts by weight, and more preferably 100 to 180 parts by weight, with respect to 100 parts by weight of the total amount of the polyamide resin and EVOH before the reaction with the epoxy group-containing polymer. If the proportion of the modified elastomer to the total amount of the polyamide resin and EVOH is too low, the resulting thermoplastic elastomer composition has poor low-temperature durability, and if the proportion of the modified elastomer to the total amount of the polyamide resin and EVOH is too high, the modified elastomer forms a continuous phase, and therefore desired thermoplastic elastomer composition cannot be obtained.

A modified elastomer having an acid anhydride group can be prepared by, for example, reacting an acid anhydride and a peroxide with an elastomer. Examples of the modified elastomer having an acid anhydride group include a maleic anhydride-modified ethylene-propylene copolymer (available as Tafmer® MP-0620 from Mitsui Chemicals, Inc.), a maleic anhydride-modified ethylene-butene copolymer (available as Tafmer® MP-7010 from Mitsui Chemicals, Inc.), a maleic anhydride-modified ethylene-butene copolymer (available as Tafmer® MP-7020 from Mitsui Chemicals, Inc.), a maleic anhydride-modified ethylene-methyl acrylate copolymer (available as Lotader® 4503 from Arkema Co.), a maleic anhydride-modified ethylene-ethyl acrylate copolymer (available as HPR® AR201 from Mitsui DuPont Polychemicals, Co., Ltd.), a maleic anhydride-modified ethylene-ethyl acrylate copolymer (available as Lotader® 4720 from Arkema Co.), a maleic anhydride-modified ethylene-butyl acrylate copolymer (available as Lotader® 4210 from Arkema Co.), etc. Particularly preferred modified elastomers are ethylene-α-olefin copolymers modified with an acid anhydride (such as maleic anhydride) and ethylene-ethyl acrylate copolymer modified with an acid anhydride (such as maleic anhydride).

Subsequent to step (2), step (3) in which an ethylene-vinyl alcohol copolymer is dispersed in the product obtained in step (1) is carried out. For example, in case that step (3) is carried out using a twin-screw kneading extruder, the product obtained in step (1), the ethylene-vinyl alcohol copolymer and the modified elastomer are melt-kneaded in the second kneading section located on the downstream side in the extrusion direction of the twin-screw kneading extruder from the second feeding port. The melt-kneading conditions in the second kneading section can be appropriately selected by a person with ordinary skill in the art, depending on the types and amounts of the polyamide resin, epoxy group-containing polymer, ethylene-vinyl alcohol copolymer and modified elastomer used. The melt-kneading temperature in the second kneading section may be a temperature which is equal to or higher than the melting temperature of the thermoplastic resin composition comprising the ethylene-vinyl alcohol copolymer and the end-capped polyamide resin, and is typically about 180° C. to about 250° C. The melt-kneading (dynamic crosslinking) time (retention time) in the second kneading section is typically about 5 seconds to about 3 minutes. A melt-kneaded mixture comprising as a continuous phase a thermoplastic resin composition comprising the ethylene-vinyl alcohol copolymer and the end-capped polyamide resin and comprising as a dispersed phase the modified elastomer dispersed in the continuous phase is formed by carrying out step (3).

Subsequent to step (3), step (4) is carried out in which a crosslinking agent for crosslinking the modified elastomer is added to the dispersion obtained in step (3). For example, in case that step (4) is carried out using a twin-screw kneading extruder, this step is carried out by introducing a crosslinking agent into the twin-screw kneading extruder through the third feeding port located on the downstream side in the extrusion direction from the second kneading section. The third feeding port is located between the second kneading section and the third kneading section as described below.

The type and amount of the crosslinking agent can be appropriately selected by a person with ordinary skill in the art, depending on the types and amounts of the polyamide resin, epoxy group-containing polymer, EVOH and modified elastomer. Examples of the crosslinking agent include compounds having at least two hydroxyl groups (for example, tris-(2-hydroxyethyl)isocyanurate (THEIC)), compounds having at least two amino groups (for example, 3,3'-diaminodiphenylsulfone (3,3'-DAS), 2,2'-diaminodiphenyldisulfide), etc. The amount of the crosslinking agent is typically 0.1 to 10 parts by weight, and more preferably 0.5 to 3 parts by weight, with respect to 100 parts by weight of the modified elastomer. Too low an amount of the crosslinking agent cannot achieve sufficient fatigue durability. Conversely, too much crosslinking agent may cause scorching during the kneading step as described below, which is carried out after the addition of the crosslinking agent, or may cause appearance defects, such as fish eye, after processing into a form of film, tube, etc.

Subsequent to step (4), step (5) is carried out in which the modified elastomer is crosslinked with the crosslinking agent. For example, in case that step (5) is carried out using a twin-screw kneading extruder, this step is carried out in the third kneading section located on the downstream side in the extrusion direction of the twin-screw kneading extruder from the third feeding port. In the third kneading section, it is preferred to melt-knead crosslinking agent and the melt-kneaded mixture comprising as a continuous phase a thermoplastic resin composition comprising the ethylene-vinyl alcohol copolymer and the end-capped polyamide resin and comprising as a dispersed phase the modified elastomer dispersed in the continuous phase, thereby dynamically crosslinking the modified elastomer. The dispersed phase can be stabilized (or fixed) in the continuous phase by the dynamic crosslinking. The melt-kneading conditions in the third kneading section can be appropriately selected by a person with ordinary skill in the art, depending on the types and amounts of the polyamide resin, epoxy group-containing polymer, EVOH, modified elastomer and crosslinking agent used. The melt-kneading temperature in the third kneading section may be equal to or higher than the melting temperature of the thermoplastic resin composition comprising the ethylene-vinyl alcohol copolymer and the end-capped polyamide resin, and is typically about 180° C. to about 250° C. The melt-kneading (dynamic crosslinking) time (retention time) in the third kneading section is typically about 5 seconds to about 3 minutes.

The thermoplastic elastomer composition of the present invention can be produced by melt-kneading the above essential components and optional ingredients using a kneading machine which is commonly used in the production of a thermoplastic resin composition, such as kneader, Banbury mixer, single-screw kneading extruder, twin-screw kneading extruder, etc. Melt-kneading is preferably carried out using a twin-screw kneading extruder, in view of the high productivity thereof. Steps (1) to (5) described above in the process for producing a thermoplastic elastomer composition of the present invention can be carried out by using a twin-screw kneading extruder having:

at least three kneading sections comprising:
a first kneading section for carrying out step (1),
a second kneading section for carrying out step (3), and
a third kneading section for carrying out step (5),
a first feeding port for a polyamide and an epoxy group-containing polyamide, located on the upstream side in the extrusion direction from the first kneading section,
a second feeding port for an ethylene-vinyl alcohol copolymer and a modified-elastomer, located between the first and second kneading sections, and
a third feeding port for a crosslinking agent, located between the second and third kneading sections.

In the process for producing the thermoplastic elastomer composition of the present invention, in addition to the above components, common ingredients for common resins and rubbers, such as fillers, reinforcing agents, processing aids, compatibilizers, stabilizers, anti-aging agents, etc., may optionally be added to improve properties such as reinforcing properties, processability, dispersibility, heat resistance, anti-aging properties, etc., insofar as the object of the present invention is not diminished. The amounts of these ingredients may be conventional common amounts, insofar as the object of the present invention is not diminished. The above optional ingredients may be added, for example, in step (2), to the end-capped polyamide resin together with the ethylene-vinyl alcohol copolymer and modified elastomer.

The thermoplastic elastomer composition, which has been melt-kneaded in step (5), may then be extruded in molten state from a die attached to the outlet port of a twin-screw kneading extruder into a film or tube form, etc., or may be extruded into a strand form, and pelletized with a resin pelletizer, and subsequently the resulting pellets are formed into a desired form, such as a film, sheet or tube form, depending on the application, using a common resin forming technique such as inflation forming, calendar forming, extrusion forming, etc.

The methods for producing manufactured articles having a layer formed from the thermoplastic elastomer composition of the present invention can be explained based on a method for producing a pneumatic tire as an example. As a method for producing a pneumatic tire having a layer formed from the thermoplastic elastomer composition of the present invention, any conventional method may be used. For example, the thermoplastic elastomer composition of the present invention is extruded into a film having a predetermined width and thickness, and the resulting film is laminated onto a tire molding drum in cylindrical form, tire members such as a carcass layer, a belt layer, a tread layer, etc., are sequentially laminated thereon, and the resulting green tire is removed from the tire molding drum. Then, the green tire is vulcanized in accordance with a conventional technique to produce a pneumatic tire having a layer (for example, as an inner liner) formed from the thermoplastic elastomer composition of the present invention.

Further, the methods for producing manufactured articles having a layer formed from the thermoplastic elastomer composition of the present invention can be explained by a method for producing a hose as an example. As a method for producing a hose having a layer formed from the thermoplastic elastomer composition of the present invention, any conventional method may be used. For example, the thermoplastic elastomer composition of the present invention is extruded on a mandrel precoated with a releasing agent with an extruder in a crosshead extrusion manner to form an inner tube, and subsequently reinforcing yarns or reinforcing steel wires are braided on the inner tube with a braiding machine to form a reinforcing layer, and a thermoplastic resin is extruded onto the reinforcing layer to form an outer tube. If needed, a layer of another thermoplastic resin and/or adhesive may be provided between the inner tube and the reinforcing layer and between the outer tube and the reinforcing layer. Finally, the mandrel is withdrawn to obtain a hose having a layer formed from the thermoplastic elastomer composition of the present invention.

EXAMPLES

The present invention will be further explained with reference to the following examples and comparative examples, and it should be understood that the scope of the present invention is not limited by these examples.

In addition, since conventional process, in which a polyamide resin is reacted with an epoxy monomer in advance, is poor handling properties as described above, an example in which no epoxy group-containing polymer was used and a modified elastomer, an ethylene-vinyl alcohol copolymer, and a polyamide resin were simultaneously introduced in a twin-screw kneading extruder is represented as Comparative Example 1, and an example in which a modified elastomer, an ethylene-vinyl alcohol copolymer, a polyamide resin and an epoxy group-modified polymer were simultaneously introduced in a twin-screw kneading extruder is represented as Comparative Example 2. Comparative Examples 1 to 2 and Examples 1 to 5 conform to the formulation (in parts by weight) in Table 1 below.

Raw Materials

Modified elastomer: a maleic anhydride-modified ethylene-butene copolymer (Tafmer® MH7020 manufactured by Mitsui Chemicals, Inc.)

EVOH: an ethylene-vinyl alcohol copolymer (Soarnol® H4815B manufactured by The Nippon Synthetic Chemical Industries Co. Ltd.) (ethylene unit content: 48 mol. %, melting temperature: 158° C.)

Polyamide resin: Nylon 6 (UBE Nylon® 1022B manufactured by Ube Industries, Ltd.) (melting temperature: 225° C.)

Epoxy group-containing polymer: an ethylene-glycidyl methacrylate copolymer (Bondfast® CG5001 manufactured by Sumitomo Chemical Co., Ltd.) (melting temperature: 100° C.)

Crosslinking agent 1: tris(2-hydroxyethyl)-isocyanurate (THEIC) (manufactured by Shikoku Chemicals Co.)

Crosslinking agent 2: 3,3'-diaminodiphenylsulfone (3,3'-DAS) (manufactured by Mitsui Fine Chemicals, Inc.)

Preparation of Thermoplastic Elastomer Composition of Comparative Example 1

The thermoplastic elastomer composition of Comparative Example 1 was prepared as described below using a twin-screw kneading extruder (TEX44 manufactured by The Japan Steel Works, Ltd.). Twin-screw kneading extruder TEX44 has a cylinder comprising a plurality of blocks (block cylinders) connected together, and can be varied in cylinder length as necessary. In Comparative Example 1, twin-screw kneading extruder TEX44 was configured so that the cylinder has the first and second kneading sections disposed, in order, from the upstream side in the extrusion direction, the first feeding port disposed on the upstream side in the extrusion direction of the first kneading section, and the second feeding port disposed between the first and second kneading sections. The modified elastomer, EVOH and polyamide resin were simultaneously introduced into the cylinder through the first feeding port and were melt-kneaded in the first kneading section set at a temperature of 230° C. A crosslinking agent was introduced into the cylinder through the second feeding port and was kneaded in the second kneading section set at 230° C. with the melt-kneaded mixture conveyed from the first kneading section to dynamically crosslink the modified elastomer. The total of the kneading times in the first and second kneading sections was 3 minutes. The resulting kneaded mixture was tried to be extruded continuously in the form of strand from the outlet port of the twin-screw kneading extruder, but the discharge state of the strand was extremely poor and the strand was frequently broken off.

Preparation of Thermoplastic Elastomer Composition of Comparative Example 2

In the preparation of the thermoplastic elastomer composition of Comparative Example 2, a twin-screw kneading extruder having the same cylinder configuration as that used in the preparation of the thermoplastic elastomer composition of Comparative Example 1 was used. The modified elastomer, EVOH and polyamide resin were simultaneously introduced into the cylinder through the first feeding port and were melt-kneaded in the first kneading section set at a temperature of 230° C. A crosslinking agent was introduced into the cylinder through the second feeding port and was kneaded in the second kneading section set at 230° C. with the melt-kneaded mixture conveyed from the first kneading section to dynamically crosslink the modified elastomer. The total of the kneading times in the first and second kneading sections was 3 minutes. The resulting kneaded mixture was extruded continuously from the outlet port of the twin-screw kneading extruder into a strand form, cooled with water, and cut with a cutter to obtain a thermoplastic elastomer composition in the form of pellets.

Preparation of Thermoplastic Elastomer Compositions of Examples 1 to 5

Thermoplastic elastomer compositions of Examples 1 to 5 were prepared as described below using a twin-screw kneading extruder (TEX44 manufactured by The Japan Steel Works, Ltd.) having a cylinder comprising the first, second and third kneading sections disposed, in order, along the extrusion direction, a pair of screws disposed within the cylinder, the first feeding port located on the upstream side in the extrusion direction from the first kneading section, the second feeding port disposed between the first and second feeding sections, and the third feeding port disposed between the second and third kneading sections. The polyamide resin and epoxy group-containing polymer were introduced in the cylinder through the first feeding port and were melt-kneaded in the first kneading section set at a temperature of 230° C. to allow the polyamide resin to react with the epoxy group-containing polymer. The modified elastomer and EVOH were introduced into the cylinder through the second feeding port and were kneaded in the second kneading section set at a temperature of 230° C. with the melt-kneaded mixture conveyed form the first kneading section to disperse the modified elastomer and EVOH in the melt mixture. A crosslinking agent was introduced in the cylinder through the third feeding port and was kneaded in the third kneading section set at a temperature of 230° C. with the melt-kneaded mixture conveyed from the second kneading section to dynamically crosslink the modified elastomer in the melt-kneaded mixture. The total of the kneading times in the first, second and third kneading sections was 3 minutes. The resulting kneaded mixture was extruded continuously from the outlet port of the twin-screw kneading extruder into a strand form, cooled with water, and cut with a cutter to obtain a thermoplastic elastomer composition in the form of pellets.

Evaluations of Thermoplastic Elastomer Compositions

The thermoplastic elastomer compositions of Comparative Examples 1 to 2 and Examples 3 to 5 were evaluated for processability (kneading properties and extrusion foamability) and dynamic fatigue durability (crack resistance).

(1) Processability

Each of the thermoplastic elastomer compositions of Comparative Examples 1 to 2 and Examples 1 to 5 was evaluated for kneading properties and extrusion formability as indices of processability.

(a) Kneading Properties

For the thermoplastic elastomer compositions of Comparative Examples 1 to 2 and Examples 1 to 5, a strand extruded from the twin-screw kneading extruder was observed, and kneading properties were evaluated according to the following criterion:

1: The surface of the strand is smooth.

2: There are slight particulate defects or roughening on the surface of the strand, or there observed slight pulsation in discharge of the strand.

3: There are roughening on the surface of the strand, and there observed significant discharge failure of the strand.

4: The discharge state of the strand is extremely poor, and the strand is frequently broken off.

(b) Extrusion Formability

Thermoplastic elastomer compositions of Comparative Example 2 and Examples 1 to 5 were respectively evaluated for extrusion formability as another index of processability. The thermoplastic elastomer composition of Comparative Example 1 has poor kneading properties, and therefore could not be extruded into a sheet form for evaluating extrusion formability.

Since it was not able to extrude the thermoplastic elastomer composition of Comparative Example 1 into a sheet form, the thermoplastic elastomer compositions of Comparative Example 2 and Examples 1 to 5 were extruded into a sheet having a thickness of 1 mm at a temperature of 230° C. using a T-die extrusion molding machine (single-screw extruder having a die width of 200 mm and a φ of 40 mm, manufactured by Pla Giken Co. Ltd.). The surface conditions of the resulting sheets were observed, and the observation results were graded according to the following criterion:

1: There is no particle or flow mark, the surface of the sheet is smooth, and the external appearance is good.

2: There observed slight particulate irregularities and surface roughening.

3: There observed a lot of particulate irregularities and surface roughening.

(2) Dynamic Fatigue Durability

Since it was not able to extrude the thermoplastic elastomer composition of Comparative Example 1 into a sheet form, the thermoplastic elastomer compositions of Comparative Example 2 and Examples 1 to 5 were evaluated for crack resistance in a pneumatic tire as an index of dynamic fatigue durability.

Firstly, a pressure-sensitive adhesive composition for laminating the thermoplastic elastomer composition as an air permeation preventing layer on the tire inner surface was prepared. The pressure-sensitive adhesive composition was prepared by introducing the raw materials shown in Table 2 below in a twin-screw kneading extruder (TEX44 manufactured by The Japan Steel Works, Ltd.), and kneading them at 120° C. for 3 minutes. The resulting kneaded mixture was extruded continuously from the extruder into a strand from, and cut with water-cooled cutter to give a pressure-sensitive adhesive composition in the form of pellets.

Then, a laminate in the form of tube was prepared by extruding the pressure-sensitive adhesive composition in the form of pellets and the thermoplastic elastomer composition in the form of pellets at 230° C. using an inflation molding machine (manufactured by Placo Co., Ltd.) to obtain a laminate in the form of a tubular double-layered film so that the thermoplastic elastomer composition is disposed at the inner side of the tube and the pressure-sensitive adhesive composition is disposed at the outer side of the tube, and blowing air into the tube to expand it, folding the tube with pinch rollers, and winding up the tube to obtain a laminate in the form of a tube. In the laminate, the thermoplastic elastomer composition layer had a thickness of 100 μm, and the pressure-sensitive adhesive composition layer has a thickness of 30 μm. This laminate was disposed on a tire molding drum as an inner liner so that the pressure-sensitive adhesive composition layer is positioned at the outer side (on the side opposite to the drum), and tire members such as a carcass layer, a belt layer, a tread layer, etc., comprising a unvulcanized rubber, were sequentially laminated thereon, and the resulting green tire was removed from the tire molding drum. Then, the green tire was vulcanized by heating according to conventional technique to produce a tire having a size of 195/65R15. The produced tire was mounted on a 15×6JJ rim, was set to an internal pressure of 200 kPa (air), was mounted on a FF passenger car of 1800 cc displacement, and run on actual road for 30,000 km. Thereafter, the tire was removed from the rim, and the thermoplastic elastomer layer disposed on the inner surface of the tire was visually observed to determine the number of cracks, and the observation results were graded according to the criterion indicated below. The smaller the number of cracks, the more superior the durability is. The results are shown in Table 1 below.

1: There is no crack.
2: The number of clacks is 1 to 5.
3: The number of cracks is 6 to 10.

TABLE 1

|  | Comparative Example 1 | Comparative Example 2 | Example 1 | Example 2 | Example 3 | Example 4 | Example 5 |
|---|---|---|---|---|---|---|---|
| Modified elastomer | 100 | 100 | 100 | 100 | 100 | 100 | 100 |
| EVOH | 47.5 | 47.5 | 47.5 | 47.5 | 47.5 | 47.5 | 47.5 |
| Polyamide resin | 21 | 19 | 19 | 19 | 20.6 | 20 | 16.1 |
| Epoxy group-containing polymer | — | 2 | 2 | 2 | 0.4 | 1 | 4.9 |
| Crosslinking agent 1 | 1.5 | 1.5 | 1.5 | — | 1.5 | 1.5 | 1.5 |
| Crosslinking agent 2 | — | — | — | 1.5 | — | — | — |
| Amount of epoxy group-containing polymer to 100 parts by weight of polyamide resin (part by weight) | 0 | 10.5 | 10.5 | 10.5 | 1.9 | 5.0 | 30.4 |
| Kneading properties | 4 | 3 | 1 | 1 | 2 | 1 | 2 |
| Extrusion formability | — | 3 | 1 | 1 | 2 | 1 | 2 |
| Crack resistance | — | 3 | 1 | 1 | 2 | 1 | 3 |

TABLE 2

Formulation of Pressure-Sensitive Adhesive Composition

|  | Amounts (parts by weight) |
|---|---|
| Epoxidized SBS*[1] | 100 |
| Zinc oxide*[2] | 5 |
| Stearic acid*[3] | 1 |
| Vulcanization accelerator*[4] | 3 |
| Tackifying resin*[5] | 30 |

Footnote of Table 2:
*[1]Epoxidized product of styrene-butadiene block copolymer (Epofriend AT501 manufactured by Daicel Chemical Industries Ltd.)
*[2]Zinc oxide of JIS grade 3 manufactured by Seido Chemical Industry Co., Ltd.
*[3]Beads Stearic Acid manufactured by Nippon Oil & Fat Co., Ltd.
*[4]Nocceler TOT-N manufactured by Ouchi Shinko Chemical Industrial Co., Ltd.
*[5]YS Resin D105 manufactured by Yasuhara Chemical Co., Ltd.

As can be seen from Table 1, the thermoplastic elastomer composition produced by the production process of the present invention has good processability and dynamic fatigue durability.

The invention claimed is:

1. A process for producing a thermoplastic elastomer composition comprising as a continuous phase a thermoplastic resin composition and as a dispersed phase a modified elastomer dispersed in the continuous phase, comprising, in order, the steps of:
   (1) reacting a polyamide resin with an epoxy group-containing polymer to produce an end-capped polyamide resin,
   (2) adding an ethylene-vinyl alcohol copolymer and a modified elastomer to the product obtained in step (1),
   (3) dispersing the ethylene-vinyl alcohol copolymer to the product obtained in step (1),
   (4) adding a crosslinking agent for crosslinking the modified elastomer to the product obtained in step (3), and
   (5) crosslinking the modified elastomer with the crosslinking agent,
   wherein the thermoplastic resin composition comprises the ethylene-vinyl alcohol copolymer and the end-capped polyamide resin,
   wherein the modified elastomer is selected from the group consisting of maleic anhydride-modified ethylene-α-olefin copolymers, maleic anhydride-modified ethylene-ethyl acrylate copolymer, and combinations of two or more of them, and
   wherein the epoxy group-containing polymer is selected from the group consisting of ethylene-glycidyl methacrylate copolymer, ethylene-glycidyl methacrylate-vinyl acetate copolymer, ethylene-glycidyl methacrylate-methyl acrylate copolymer, ethylene-glycidyl methacrylate-ethyl acrylate copolymer, ethylene-glycidyl methacrylate-graft-polystyrene, ethylene-glycidyl methacrylate-graft-acrylonitrile-styrene copolymer, epoxidized styrene-butadiene-styrene block copolymer, epoxidized natural rubber, and combinations of two or more of them.

2. The process according to claim 1, wherein steps (1) to (5) are carried out by using a twin-screw kneading extruder having:
   at least three kneading sections comprising:
      a first kneading section for carrying out step (1),
      a second kneading section for carrying out step (3), and
      a third kneading section for carrying out step (5),
   a first feeding port for a polyamide and an epoxy group-containing polymer, located on the upstream side in the extrusion direction from the first kneading section, a second feeding port for an ethylene-vinyl alcohol copolymer and a modified-elastomer, located between the first and second kneading sections, and a third feeding port for a crosslinking agent, located between the second and third kneading sections.

3. The process according to claim 2, wherein the epoxy group-containing polymer is in an amount of 0.5 to 40 parts by weight per 100 parts by weight the polyamide.

4. The process according to claim 2, wherein the ethylene-vinyl alcohol copolymer has an ethylene content of 1 to 55 mol % and a saponification degree of 90% or more.

5. The process according to claim 2, wherein the polyamide resin is selected from the group consisting of Nylon 6, Nylon 66, Nylon 11, Nylon 12, Nylon 610, Nylon 612, Nylon 6/66 copolymer, Nylon 6/12 copolymer, Nylon MXD6, Nylon 6T, and combinations of two or more of them.

6. The process according to claim 1, wherein the epoxy group-containing polymer is in an amount of 0.5 to 40 parts by weight per 100 parts by weight the polyamide.

7. The process according to claim 6, wherein the ethylene-vinyl alcohol copolymer has an ethylene content of 1 to 55 mol % and a saponification degree of 90% or more.

8. The process according to claim 6, wherein the polyamide resin is selected from the group consisting of Nylon 6, Nylon 66, Nylon 11, Nylon 12, Nylon 610, Nylon 612, Nylon 6/66 copolymer, Nylon 6/12 copolymer, Nylon MXD6, Nylon 6T, and combinations of two or more of them.

9. The process according to claim 1, wherein the ethylene-vinyl alcohol copolymer has an ethylene content of 1 to 55 mol % and a saponification degree of 90% or more.

10. The process according to claim 9, wherein the polyamide resin is selected from the group consisting of Nylon 6, Nylon 66, Nylon 11, Nylon 12, Nylon 610, Nylon 612, Nylon 6/66 copolymer, Nylon 6/12 copolymer, Nylon MXD6, Nylon 6T, and combinations of two or more of them.

11. The process according to claim 1, wherein the polyamide resin is selected from the group consisting of Nylon 6, Nylon 66, Nylon 11, Nylon 12, Nylon 610, Nylon 612, Nylon 6/66 copolymer, Nylon 6/12 copolymer, Nylon MXD6, Nylon 6T, and combinations of two or more of them.

* * * * *